(12) United States Patent
Nagai et al.

(10) Patent No.: US 6,181,579 B1
(45) Date of Patent: Jan. 30, 2001

(54) DC-DC CONVERTER

(75) Inventors: Jun Nagai, Sagamihara; Tadahiko Matsumoto, Yokohama, both of (JP)

(73) Assignee: Murata Manufacturing Co., Ltd. (JP)

( * ) Notice: Under 35 U.S.C. 154(b), the term of this patent shall be extended for 0 days.

(21) Appl. No.: 09/558,403

(22) Filed: Apr. 25, 2000

(30) Foreign Application Priority Data

Apr. 30, 1999 (JP) .................................................. 11-123526

(51) Int. Cl.[7] .................................................. H02M 3/335
(52) U.S. Cl. .................................................. 363/21
(58) Field of Search .................. 363/20, 21, 55, 363/56, 95, 97, 131

(56) References Cited

U.S. PATENT DOCUMENTS

| | | | |
|---|---|---|---|
| 5,519,599 | * 5/1996 | Shinada et al. | 363/21 |
| 5,559,682 | * 9/1996 | Kanouda et al. | 363/21 |
| 5,781,420 | * 7/1998 | Xia et al. | 363/21 |
| 5,999,420 | * 12/1999 | Aonuma et al. | 363/21 |
| 6,061,255 | * 5/1996 | Chik et. al. | 363/21 |

* cited by examiner

*Primary Examiner*—Matthew Nguyen
(74) *Attorney, Agent, or Firm*—Ostrolenk, Faber, Gerb & Soffen, LLP (57) ABSTRACT

A DC—DC converter has a main switching element provided on the primary side of a transformer, a drain to source path of a synchronous rectifier on a rectification side comprising a MOSFET which switches in synchronism with the switching operation of the main switching element disposed on a line connecting one terminal side of the secondary coil of the transformer with an output terminal of a circuit on the secondary side of the transformer, and a gate of the synchronous rectifier on the rectification side connected so as to have applied thereto a voltage corresponding to an output voltage of the secondary coil via an input capacitor on the rectification side, so that a voltage generated on the primary side by switching operation of said main switching element is transmitted to the secondary side to be rectified and smoothed to output a DC voltage. A series circuit including a diode and a charge accumulating capacitor has the forward direction of the diode from the gate to source of the synchronous rectifier and is connected between the gate and source of the synchronous rectifier and a discharge device for the charge accumulating capacitor is connected in parallel with the charge accumulating capacitor.

11 Claims, 6 Drawing Sheets

DC-DC CONVERTER

BACKGROUND OF THE INVENTION

1. Field of the Invention

The present invention relates to a DC—DC converter (forward converter) which comprises a MOSFET synchronous rectifying element, and is suitable for parallel operation.

2. Description of the Related Art

Figure 7:
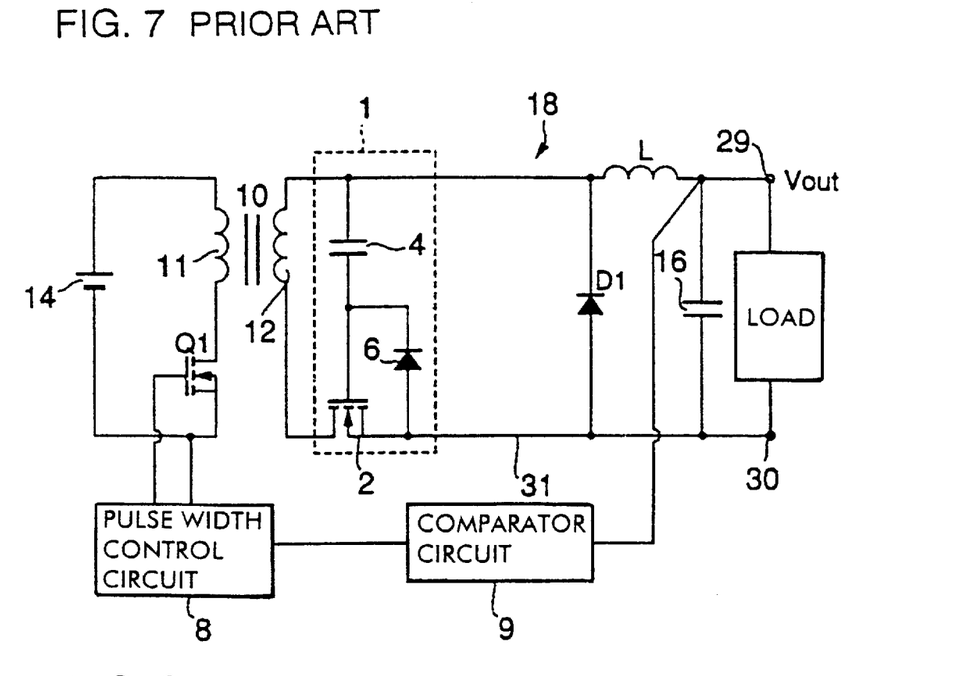
FIG. 7 is a circuit diagram of a conventional forward converter.

A circuit of a major part of a DC—DC converter (forward converter) comprising a synchronous rectifying element of a MOSFET is shown in FIG. 7. The circuit is disclosed in Japanese Unexamined Patent Publication No. 9-51260, and is a type where an input side circuit is isolated from an output side circuit by a transformer 10. In FIG. 7, one terminal of the primary coil 11 of the transformer 10 is connected to the anode of a DC input source 14, and the other terminal of the primary coil 11 is connected to the drain of a main switching element Q1 comprising a MOSFET. The source of the main switching element Q1 is connected to the cathode of the DC input source 14, and the gate of the main switching element Q1 is connected to a pulse width control circuit 8.

The secondary coil 12 of the transformer 10 is connected to a synchronous rectifier driving circuit 1. The synchronous rectifier driving circuit 1 comprises a synchronous rectifier 2 on a rectification side comprising a MOSFET, an input capacitor 4 on the rectification side, and a clamp diode 6 on the rectification side, and one terminal side of the input capacitor 4 on the rectification side is connected to one terminal side of the secondary coil 12, and the other terminal side of the input capacitor 4 on the rectification side is connected to the gate of the synchronous rectifier 2 on the rectification side. The drain of the synchronous rectifier 2 on the rectification side is connected with the other terminal of the secondary coil 12, and between the gate and the source of the synchronous rectifier 2 on the rectification side, the clamp diode 6 on the rectification side is connected so as to have its cathode side connected to the gate of the synchronous rectifier 2.

A connection of the secondary coil 12 to the input capacitor 4 on the rectification side is connected with an output terminal (+ side output terminal) 29, and the source terminal of the synchronous rectifier 2 on the rectification side is connected with an output terminal (- side output terminal) 30 via a conductor line 31. Between the conductor line 31 and an input terminal of a choke coil L, a diode D1 is connected such that its cathode is connected to the choke coil, a smoothing capacitor 16 is connected between the conductor line 31 and an output terminal of the choke coil L, and a load is connected between the output terminals 29 and 30. These connecting circuits of the secondary coil 12, the synchronous rectifier driving circuit 1, the diode D1, the choke coil L, and the smoothing capacitor 16 constitute a rectifying smoothing circuit 18.

A voltage detecting terminal for detecting an output voltage is connected to an output terminal side of the choke coil L, and an output voltage detected by the voltage detecting terminal is applied to a comparator circuit 9. The comparator circuit 9 compares the detected voltage applied from the voltage detecting terminal with a reference voltage, and a signal comprising the compared result is applied to a pulse width control circuit 8. The pulse width control circuit 8, receiving the signal from the comparator circuit 9, controls a pulse width of a switch driving control signal to be applied to the main switching element Q1 so as to have the output voltage at a fixed constant voltage.

When the main switching element Q1 is turned on in this circuit, the secondary coil 12 outputs a voltage of the primary coil 11 in a ratio (n2/n1) comprising the number n2 of turns of the secondary coil 12 relative to the number n1 of turns of the primary coil 11. At this time, a voltage is generated in a direction from the input capacitor 4 on the rectification side toward the gate of the synchronous rectifier 2 on the rectification side, an electric charge is charged on an input capacitance $C_{iss}$ of the capacitor 4 on the rectification side and the synchronous rectifier 2 on the rectification side, and the synchronous rectifier 2 on the rectification side is turned on. A voltage outputted from the secondary coil 12 is rectified by the synchronous rectifier 2 of the rectification side and the diode D1, then smoothed by the choke coil L and the smoothing capacitor 16, and supplied to a load as a DC output voltage $V_{out}$ in a substantially constant voltage. At this time, the diode D1 stays in an off-state.

When the main switching element Q1 is turned off, a voltage is generated at the secondary coil 12 in the opposite polarity as the voltage generated when the main switching element Q1 is turned on, and the diode D1 is turned on. In an on-period of the main switching element Q1 (on-period of the synchronous rectifier 2 on the rectification side), the electric charge charged on the input capacitance $C_{iss}$ of the input capacitor 4 on the rectification side and the synchronous rectifier 2 on the rectification side is discharged, and the synchronous rectifier 2 on the rectification side is turned off. On the other side, the synchronous rectifier 2 on the rectification side is turned on when a voltage $V_{gs}$ across the gate and source of the synchronous rectifier 2 on the rectification side is at −Vf (Vf: a forward direction voltage drop of the clamp diode 6 on the rectification side) to cause an electric current to flow, and the minimum value of the voltage $V_{gs}$ across the gate and source of the synchronous rectifier 2 on the rectification side is clamped at −Vf. Consequently, the voltage across the gate and source of the synchronous rectifier 2 on the rectification side during the on-period of the synchronous rectifier 2 on the rectification side is maintained unchanged at a constant level, despite a change of the duty of the main switching element Q1.

In other words, when the electrostatic capacitance of the input capacitor 4 on the rectification side is C2, input capacitance of the synchronous rectifier 2 on the rectification side is Ciss, and an output voltage of the secondary coil 12 is V2, at the time of steady operation, the voltage Vgs across the gate and source of the synchronous rectifier 2 on the rectification side at the time when the main switching element Q1 is on (when the synchronous rectifier 2 on the rectification side is on) is determined by the follwing equation, namely;

$$Vgs=\{C2/(Ciss+C2)\} \times V2$$

As can be understood from the equation, by setting a ratio for $C_{iss}$ relative to C2 at optimum, an optimum gate driving voltage of the synchronous rectifier 2 on the rectification side can be set, and as the optimum gate driving voltage can be maintained at the constant level irrespective of change of the duty of the main switching element Q1, by clamping action of the clamp diode 6 on the rectification side, there is an advantage that the gate driving loss of the synchronous rectifier 2 on the rectification side can be minimized.

Figure 4:
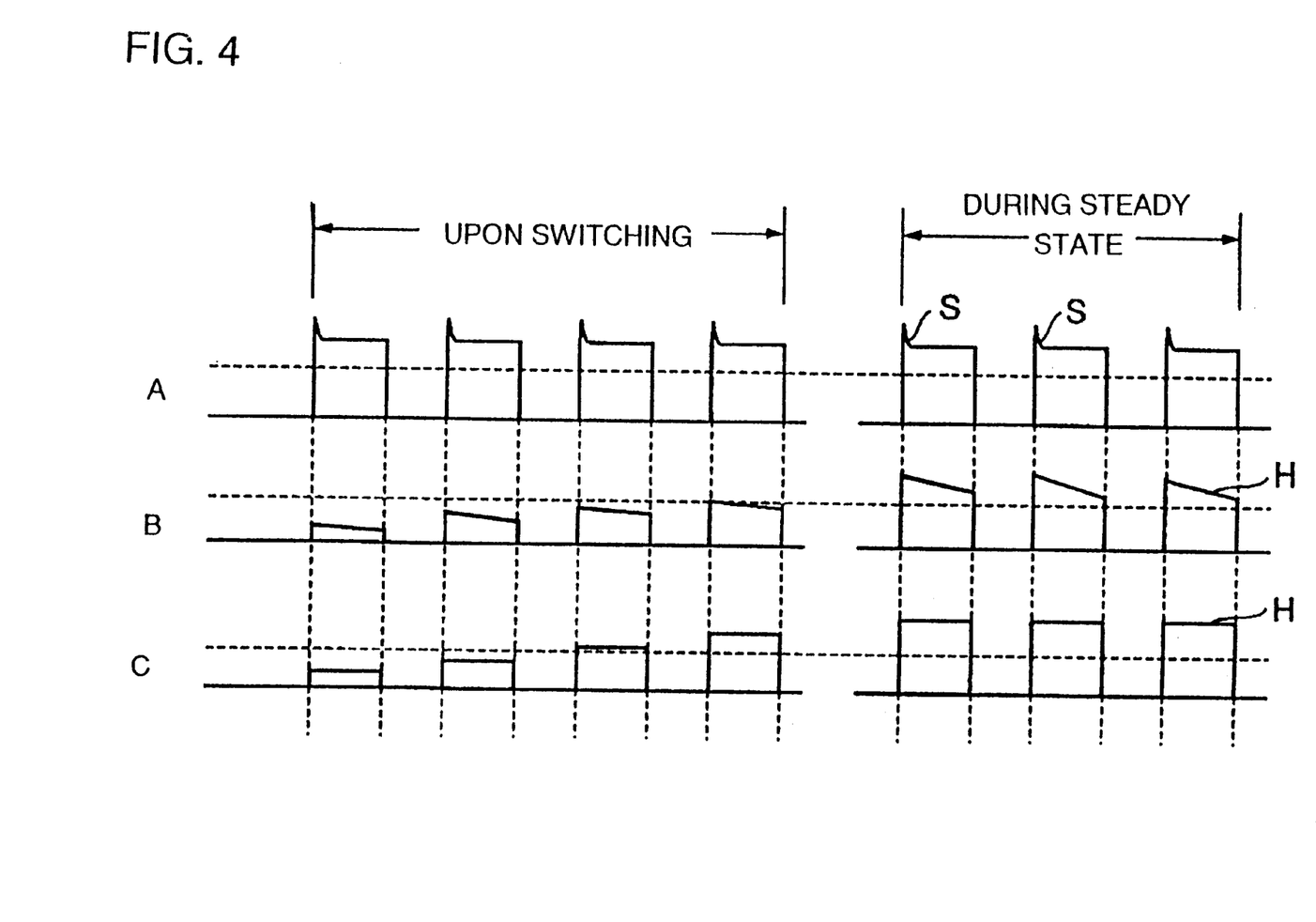
FIG. 4 is a chart showing comparison of the conventional embodiment and the embodiment of the present invention of gate driving waveforms of synchronous rectifiers on the rectification side.

Waveform A in FIG. 4 is a gate driving waveform of a synchronous rectifier 2 on the rectification side in a circuit of the above-described conventional embodiment, and as can be understood from the waveforms, at a turned-on point of a switch, a spike voltage S caused by the leakage inductance of the transformer 10 is generated, and is applied across the gate and source of the synchronous rectifier 2 on the rectification side, and across the cathode and anode of the Diode D1. As the gate driving loss due to the spike voltage S increases with the increase of the leakage inductance of the transformer 10, it is likely that breakdown of the synchronous rectifier 2 on the rectification side or the diode D1 may be caused. Therefore, improvement thereof is desired.

Figure 8:
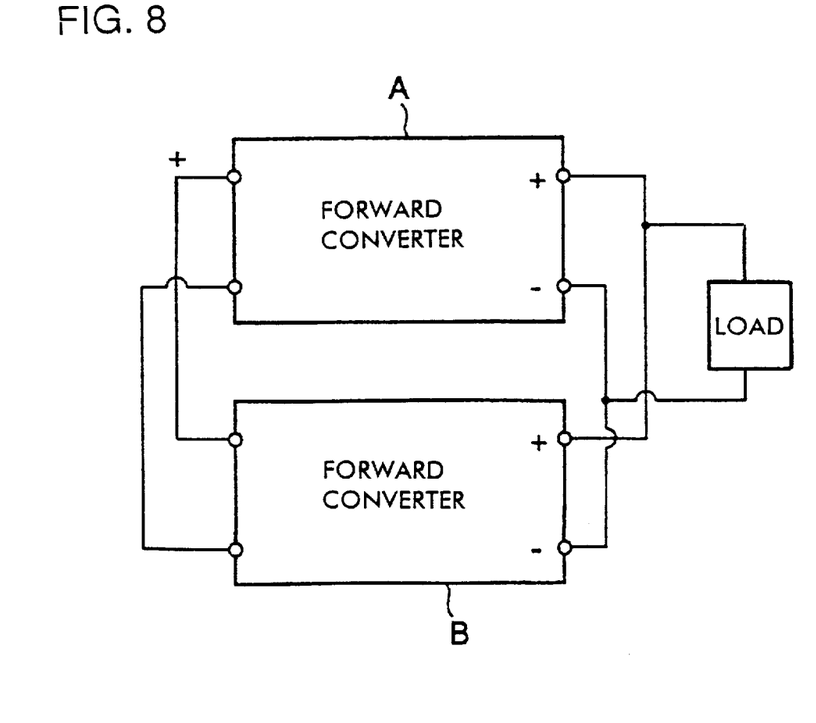
FIG. 8 is an explanatory diagram of an operating mode of two forward converters in parallel.

As shown in FIG. 8, as an application mode of a DC—DC converter (hereinafter also called as forward converter), a system is employed wherein a plurality of the forward converters (two forward converters in FIG. 8) are driven in parallel to supply a fixed DC current from respective forward converters to the common load. This sort of parallel operation is employed when an output current from one forward converter is not enough for the current quantity required by a load, or the like.

However, when such forward converters are operated in parallel, timing of circuit activating operation shifts because of variations in characteristics of circuit parts or the like of respective forward converters, and a phenomenon occurs, for example, while a forward converter A has started switching operation, a forward converter B is still in non-operating state. If such situation occurs, by an output voltage of the forward converter A which is in the operating state, a synchronous rectifier of the forward convert B is mistakenly turned on, and a current flows from the output terminal of the forward converter A to the output terminal of the forward converter B which is in non-operating state, and the current flows toward the secondary coil 12 side of the forward converter B in non-operating state, and thus a problem is caused that parts of the main switching elements Q1 or the like of the forward converter B are damaged by the reverse current.

When an output voltage of the forward converter A in operating state is applied across the gate and source of the synchronous rectifier 2 on the rectification side of the forward convert B and the threshold voltage of the synchronous rectifier 2 on the rectification side is exceeded thereby, a current flows in the reverse way from the output terminal of the forward converter B through the choke coil L of the forward converter B, and the secondary coil 12 of the transformer 10, to the synchronous rectifier 2 on the rectification side, to excite a core of the transformer 10 of the forward converter B in non-operating state. In the excited state of the core, if the forward converter B delays in starting switching operation, at the moment, an excessive surge voltage is generated at the main switch Q1 and the diode D1, and a problem arises that these circuit elements are damaged thereby.

Further, when the leakage inductance of the transformer 10 is large, at the moment when the main switching element Q1 is turned on, a surge voltage caused by the above-described leakage inductance is generated across the gate and source of the synchronous rectifier 2 on the rectification side, and the diode D1, causing a problem to occur that it is difficult to use lower voltage components and instead higher cost high voltage rated components must be used.

SUMMARY OF THE INVENTION

Observing the above-described problems, the present invention is provided to solve the problems, and an object thereof is to provide a forward converter wherein generation of a spike voltage caused by the leakage inductance of a transformer at the time when a synchronous rectifier on a rectification side is switched on can be suppressed, and when a plurality of DC—DC converters (forward converters) are operated in parallel, even if timing shifts in activating operation occur, a current reversing phenomenon from a forward converter in operating state to a forward converter in non-operating state is prevented from occurring, failure of a main switching element Q1 and a diode D1 due to the reverse current is prevented, and at the same time, a surge voltage caused by the leakage inductance of the transformer is suppressed from being exerted on the diode D1, and when a clamp diode on the rectification side is provided in the similar way as the forward converter circuit of the conventional embodiment, by the clamping action thereof, the gate driving loss of the synchronous rectifier on the rectification side can be reduced by optimizing the gate driving voltage of the synchronous rectifier on the rectification side.

Further, another object of the present invention is to provide a safe DC—DC converter capable of coping with other various reversing modes (electric current reversing modes) of a synchronous rectifier, by structuring a DC—DC converter such that an electric charge of an electric charge accumulating capacitor is discharged as required, for example, by operation such that, at the moment when a DC—DC converter in operation halts oscillation by a remote switch, the discharge switch is turned on to discharge the electric charge out of the electric charge accumulating capacitor to have the synchronous rectifier turn off, or the like.

In order to achieve the above-described objects, according to a first aspect of the present invention has a structure, as a means to solve the problems, in that, on the primary side of a transformer, a main switching element is provided, on the secondary side of the transformer, a drain to source path of a MOSFET synchronous rectifier on the rectification side is operated to be in synchronism with the switching operation of the main switching element and is inserted on the path connecting one terminal side of the secondary coil of the transformer with a circuit output terminal, a gate of the synchronous rectifier on the rectification side being connected so that a voltage corresponding to an output voltage of the secondary coil is applied via an input capacitor on the rectification side, and a voltage generated on the primary side by the switching operation of the main switching element is transmitted to the secondary side to rectify and smooth for outputting a DC current, wherein a series circuit of a diode on the rectification side with the electric charge accumulating capacitor having the direction from the gate to source of the synchronous rectifier on the rectification side as the forward direction of the diode is connected between the gate and source of the synchronous rectifier on the rectification side, and a discharging means of the electric charge accumulating capacitor is connected in parallel with the electric charge accumulating capacitor.

A second aspect of the invention has a structure, as a means to solve the problems, in that, on a structure having the first aspect provided thereon, a drain to source path of a synchronous rectifier on a commutation side of the MOSFET which performs switching operation in synchronism with the switching operation of the main switching element is inserted between both terminals of the secondary coil of the transformer, the gate of the synchronous rectifier on the commutation side is connected such that a voltage corresponding to the inverted voltage of the secondary coil at the time when the main switching element is off is applied via the input capacitor on the commutation side, and between the gate and source of the synchronous rectifier on the commutation side, a series circuit of the diode of the commutation side with the electric charge accumulating capacitor is connected having the direction from the gate to source as the forward direction of the diode, and the electric charge accumulating capacitor is in common use with the electric charge accumulating capacitor connected with the diode on the commutation side.

Further, a third aspect of the present invention has a structure, as means to solve the problems, in that, the structure having the first and the second aspects of the present invention provided thereon, has a discharge switch connected in parallel with an electric charge accumulating capacitor, and a switch discharge driver for compulsorily discharging electric charge accumulated in the electric charge accumulating capacitor by driving the discharge switch, when a halt of the switching operation of a circuit is detected, when the reference value is exceeded by the peak voltage of a reset pulse of the transformer, or when a reverse current from the output terminal of a circuit toward the secondary coil side of the transformer is detected.

As described heretofore, according to the present invention, even when the leakage inductance of a transformer is large, a spike voltage caused by the leakage inductance never appears at the on-state starting position of the gate driving waveforms of the synchronous rectifier on the rectification side, and therefore, the increase of the gate driving loss caused by the spike voltage can be prevented.

In the present invention of the above-described structures, for example, when a plurality of DC—DC converters (forward converters) are operated in parallel, if timing shifts in activating operation between mutual forward converters occur, a voltage is applied across an output terminal of a forward converter in non-operating state from a forward converter in operating state, however, when the applied voltage is added, a diode on the rectification side of the forward converter in the non-operating state is turned on, and the electric charge due to the applied voltage is pulled into an electric charge accumulating capacitor, and the electric charge is accumulated by the electric charge accumulating capacitor, thus the voltage across the gate and source of the synchronous rectifier on the rectification side is short of the threshold value, therefore the synchronous rectifier on the rectification side is unable to turn on. Consequently, a forward converter in non-operating state receives no reverse current from the output side of the forward converter in operating state, and adverse effects due to the reverse current can be prevented.

Moreover, with a structure that a discharge switching element is connected in parallel with an electric charge accumulating capacitor, and when a halt of switching operation of a circuit is detected, when the reference value is exceeded by the peak voltage of a reset pulse of a transformer, or when the reverse current from the output terminal of a circuit toward the secondary coil side of the transformer is detected, an accumulated electric charge of the electric charge accumulating capacitor is compulsorily discharged by having a discharge switching element operated, whatever mode of the reverse current is generated, the breakdown of the main switching element or the synchronous rectifier on the rectification side caused by the reverse current due to the reverse current mode can be prevented.

During steady operation, even if a spike voltage occurs at switch-on starting time of the synchronous rectifier on the rectification side, caused by the leakage inductance of the transformer, the current due to the spike voltage is released from the diode of the rectification side to a discharging means, thus the gate of the synchronous rectifier on the rectification side is prevented from having the spike voltage impressed thereon, and therefore derating for the breakdown voltage across the gate and source of the synchronous rectifier on the rectification side can be obtained easily.

Furthermore, similar to the conventional embodiment, by providing a clamp diode on the rectification side or the commutation side, the gate driving voltage of a synchronous rectifier can be optimized, and the gate driving loss can be reduced, without being influenced by the duty ratio of the main switching element.

Moreover, a forward converter of the present invention is simple in the circuit structure thereof, and the forward converter of the present invention having superior performance can be economically provided.

For the purpose of illustrating the invention, there is shown in the drawings several forms which are presently preferred, it being understood, however, that the invention is not limited to the precise arrangements and instrumentalities shown.

DETAILED DESCRIPTION OF EMBODIMENTS OF THE INVENTION

Hereinafter, the preferred embodiments of the present invention are explained in detail with reference to the drawings.

Embodiments of the present invention are described hereinafter with reference to the drawings. In the following descriptions of the respective embodiments, the same components as the circuit components of the conventional embodiment are denoted by the same symbols, and the common components between respective embodiments are also denoted by the same symbols, thus simplifying or omitting the repetitive descriptions thereof.

Figure 1:
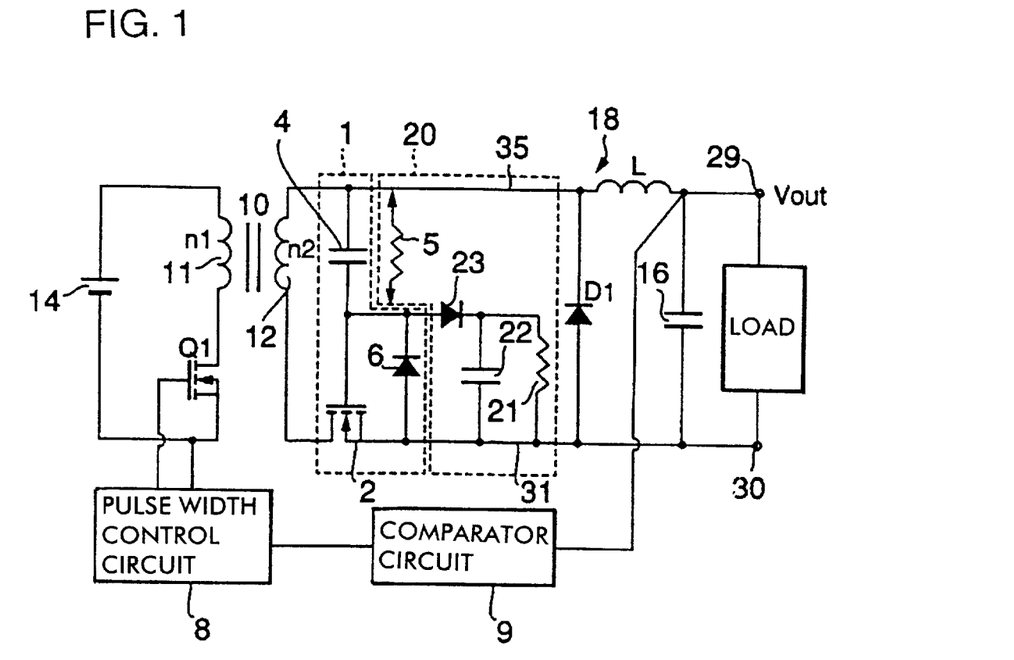
FIG. 1 is a circuit diagram of the major structure of a first embodiment of a forward converter according to the present invention.

FIG. 1 shows a major circuit configuration in a first embodiment of a DC—DC converter (forward converter) according to the present invention. A feature of the present embodiment differentiated from the conventional embodiment is that a snubber circuit 20 on a rectification side is provided downstream of a synchronous rectifier driving circuit 1, and otherwise it is the same as the circuit of the conventional embodiment. The snubber circuit 20 on the rectification side comprises a snubber resistor 21 functioning as a discharging means, an electric charge accumulating capacitor 22, and a snubber diode 23 on the rectification side as a diode on the rectification side. To the cathode of the snubber diode 23 on the rectification side, one terminal of the electric charge accumulating capacitor 22 is connected, and the snubber diode 23 on the rectification side and the electric charge accumulating capacitor 22 form a series circuit, the series circuit being connected in parallel between the gate and source of the synchronous rectifier 2 on the rectification side having the gate side of the synchronous rectifier 2 on the rectification side connected to the anode side of the snubber diode 23 on the rectification side, and the snubber resistor 21 of the discharging means is connected in parallel with the electric charge accumulating capacitor 22.

The forward converter of the present embodiment achieves not only the result similar to the conventional embodiment that the gate driving voltage of the synchronous rectifier 2 on the rectification side is maintained at the optimum value, by the clamping action of the clamp diode 6 on the rectification side, without being dependent on the duty ratio of the main switching element Q1, but also the following peculiar operational effects by the snubber circuit 20 on the rectification side are provided.

Namely, in a circuit of the present embodiment, during the steady operating time of the forward converter, when a surge voltage caused by the leakage inductance of the transformer 10 is applied across the driving circuit of the synchronous rectifier 2 on the rectification side, the snubber diode 23 on the rectification side of the snubber circuit 20 is turned on to charge into electric charge to the electric charge accumulating capacitor 22 to discharge at the time constant with the snubber resistor 21. Consequently, even if a spike voltage caused by the leakage inductance of the transformer 10 is to occur while the synchronous rectifier 2 on the rectification side is in on-state, the spike voltage is absorbed by the snubber circuit 20 on the rectification side, therefore there is no spike voltage S (waveform A in FIG. 4) generated, which is displayed in the waveform of the conventional embodiment in the gate driving waveform of the synchronous rectifier 2 on the rectification side, and thus breakdown of the synchronous rectifier 2 on the rectification side and the snubber diode 23 caused by the spike voltage can be prevented.

Waveform B in FIG. 4 shows gate driving waveforms of the synchronous rectifier 2 on the rectification side in a circuit of the present embodiment. The waveforms, being also without the spike voltage S of the conventional embodiment as shown in wave form A, provides a removing effect for the spike voltage of the present embodiment.

In the circuit of the present embodiment, when the circuit is activated, at the point when the main switching element is first turned on, the electric charge accumulating capacitor 22 has not yet accumulated electric charge, and though a voltage is generated, as the main switching element Q1 is turned on, at the secondary coil 12 of the transformer 10, and a current flows in the input capacitor 4 on the rectification side, a majority thereof is consumed in charging the electric charge accumulating capacitor 22, and thus a voltage across the gate and source due to charging into the input capacitance of the synchronous rectifier 2 on the rectification side is short of the threshold value. Then, when the main switching element Q1 is turned off, the gate accumulating electric charge (electric charge of the input capacity) of the synchronous rectifier 2 on the rectification side is discharged and becomes zero. Further, the charged electric charge of the input capacitor 4 on the rectification side is discharged via the secondary coil 12 of the transformer 10 and the choke coil L.

When the switching element Q1 is again turned on, up to the voltage where the electric charge accumulating capacitor 22 is reached by charging in the first cycle, only the gate of the synchronous rectifier 2 of the rectification side is charged, and then, the snubber diode 23 on the rectification side is turned on, and the electric charge is accumulated in the input capacitance of the synchronous rectifier 2 on the rectification side and the electric charge accumulating capacitor 22. As the electric charge accumulating capacitor 22 has already accumulated electric charge at the time when the main switching element Q1 is turned on for the first time, the electric charge is further added to be accumulated when the main switching element Q1 is turned on for the second time.

The gate driving waveforms of the synchronous rectifier 2 on the rectification side at the time of the activation are shown by the waveform B of FIG. 4, which describe the state where the gate driving voltage increases along with increase of the accumulated quantity of the electric charge, as the electric current is accumulated in the electric charge accumulating capacitor 22, each time the main switching element Q1 repeats the switch-on. As described heretofore, the electric charge of the electric charge accumulating capacitor 22 is charged in pumping style at each time the main switching element Q1 is switched on, and the voltage across the terminals of the electric charge accumulating capacitor 22, namely the voltage across the gate and source of the synchronous rectifier 2 on the rectification side gradually increases. Then, when the threshold value of the synchronous rectifier 2 on the rectification side is exceeded by the voltage across the terminals of the electric charge accumulating capacitor 22, the synchronous rectifier 2 on the rectification side is turned on in synchronism with the turning-on operation of main switching element Q1, and the synchronous rectifier 2 on the rectification side goes into steady state operation.

Figure 5:
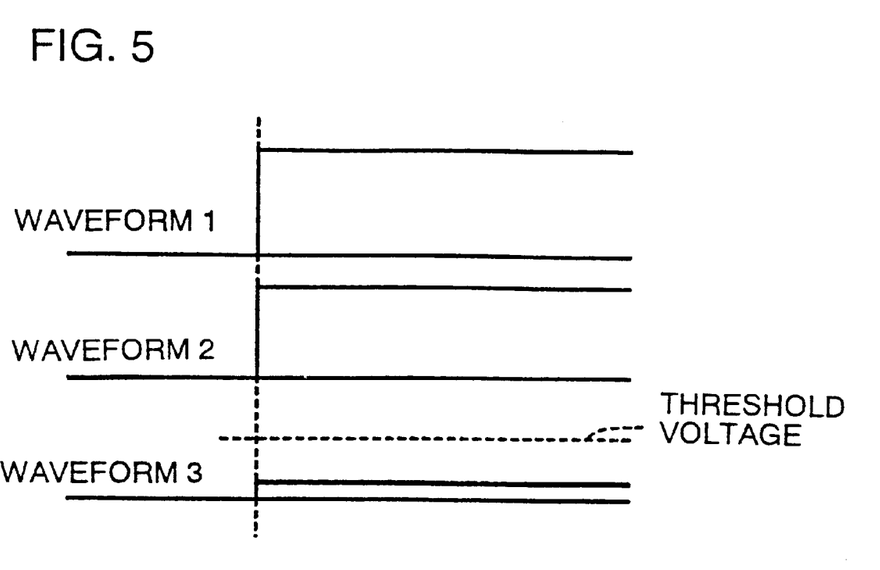
FIG. 5 is an explanatory diagram showing voltage distribution of respective members of a forward converter when a voltage is applied to the output terminal of the forward converter in non-operating state.

Moreover, when a plurality of DC—DC converters (forward converters) of the present embodiment are operated in parallel as shown in FIG. 8, there may be a case where a forward converter A is in an operating state while a forward converter B is in a non-operating state, caused by a shift or the like in the timing of activating the operation. In such case, although a DC voltage, for example, in the waveform 1 in FIG. 5 is applied from the output terminal of the forward converter A in operating state to the output terminal of the forward converter B in non-operating state, in the circuit of the present embodiment, the synchronous rectifier 2 of the rectification side is not turned on until the electric charge accumulated in the electric charge accumulating capacitor 22 reaches a charging voltage exceeding the threshold value of the synchronous rectifier 2 of the rectification side by repetitive pumping operation of the main switching element Q1 as previously described, and therefore, the synchronous rectifier 2 on the rectification side of the forward converter B in non-operating state is never turned on by the voltage applied by the above-described forward converter A. Therefore, the reverse current never flows from the output terminal side to the forward converter B in non-operating state, and a variety of problems of the above-described conventional embodiment caused by the current reversing phenomenon can be effectively prevented.

Further, in FIG. 5, waveform 2 shows the waveform of a voltage charged in the capacitor 4 of the rectification side when a DC voltage is applied across output terminals 29 and 30, and waveform 3 shows the waveform of the gate voltage of the synchronous rectifier 2 on the rectification side at the time, and even if a DC voltage is applied across the output terminals 29 and 30, the gate voltage of the synchronous rectifier 2 on the rectification side never reaches the threshold value. Thus it can be understood that, the synchronous rectifier on the rectification side is never turned on.

Figure 2:
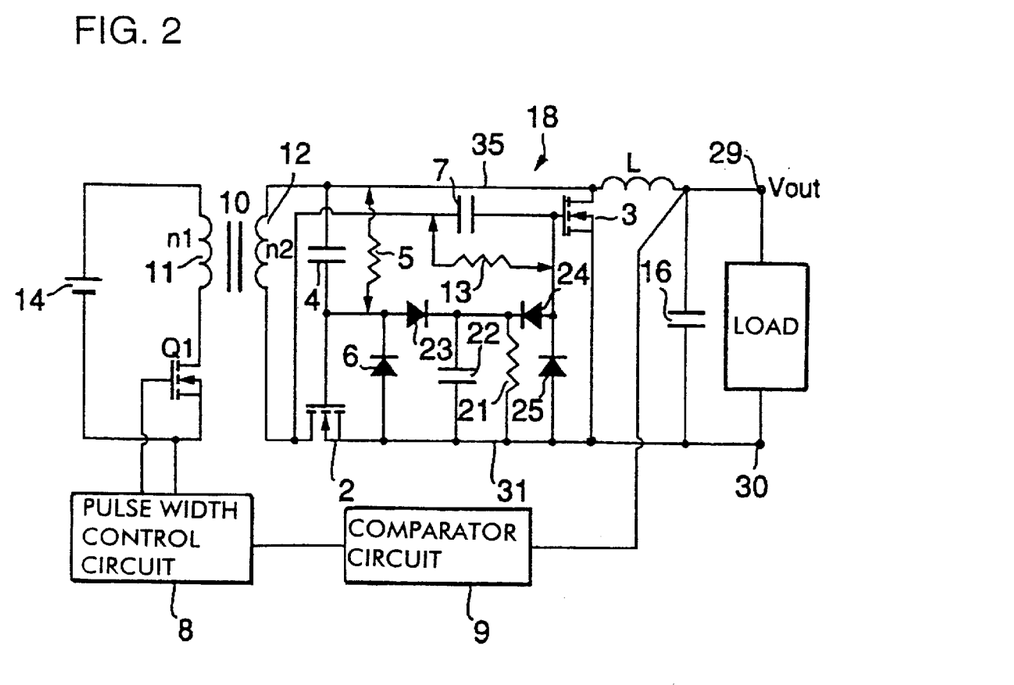
FIG. 2 is a circuit diagram of the major structure of a second embodiment of a forward converter according to the present invention.

FIG. 2 shows a configuration of a second embodiment of the present invention. The second embodiment is differentiated from the first embodiment in that the diode D1 in the first embodiment is structured as a MOSET commutating synchronous rectifier 3, and the synchronous rectifier 3 on the commutation side is structured to be operable by a similar circuit as the synchronous rectifier 2 on the rectification side, and the other structure is the same as the above-described first embodiment.

In the second embodiment, the gate of a synchronous rectifier 3 on the commutation side is connected to one terminal side of the secondary coil 12 via a capacitor 7 on the commutation side. The terminal of the secondary coil 12 with which the input capacitor 7 on the commutation side is connected is the terminal on the opposite side of the terminal of the secondary coil 12 connected to the input capacitor 4 of the rectification side, and in the circuit shown in FIG. 2, the terminal of the input capacitor 7 on the commutation side is connected the drain side of the synchronous rectifier 2 on the rectification side. Further, the drain of the synchronous rectifier 3 on the commutation side is connected to the input side of the choke L, namely a conductor line 35 leading from the connection of the secondary coil 12 to the input capacitor 4 on the rectification side to the input terminal of the choke coil L, and the source of the synchronous rectifier 3 on the commutation side is connected to the conductor line 31.

Between the conductor line 31 and the gate of the synchronous rectifier 3 on the commutation side, namely between the gate and source of the synchronous rectifier 3 on the commutation side, a clamp diode 25 of the commutation side is connected having its cathode connected to the gate side of the synchronous rectifier 3 on the commutation side, and the synchronous rectifier 3 of the commutation side, the input capacitor 7 on the commutation side, and the clamp diode 25 of the commutation side constitute a synchronous rectifier driving circuit of the synchronous rectifier 3 on the commutation side corresponding to the synchronous rectifier driving circuit 1 of the synchronous rectifier 2 on the rectification side.

Further, between the gate and source of the synchronous rectifier 3 on the commutation side, a series circuit comprising a snubber diode 24 on the commutation side having the anode of the snubber diode 24 connected to the gate side of the synchronous rectifier 3 on the commutation side and the electric charge accumulating capacitor 22 with the snubber resistor 21 as a discharging means connected in parallel with the electric charge accumulating capacitor 22, is disposed. The connecting circuit with the snubber diode 24 on the commutation side, the snubber resistor 21, and the electric charge accumulating capacitor 22 constitute a snubber circuit on the commutation side, and the snubber resistor 21 and the electric charge accumulating capacitor 22 serve also as the snubber resistor 21 of the snubber circuit 20 on the rectification side and the electric charge accumulating capacitor 22. Thereby the number of the circuit parts are reduced.

In the second embodiment, as the on-state operation of the synchronous rectifier 3 on the commutation side when the main switching element Q1 is in off-state is to be performed in a circuit similar to the circuit of the on-state operation of the synchronous rectifier 2 of the rectification side when the main switching element Q1 is in on-state, based on the similar principle as the operation of the synchronous rectifier 2 on the rectification side, a surge voltage applied to both gates of the synchronous rectifier 2 on the rectification side and the synchronous rectifier 3 on the commutation side can be suppressed, and when a plurality of forward converters in the second embodiment are operated in parallel, similar to the case of the first embodiment, the flow of the reverse current to the forward converter in non-operating state can be prevented. The other operational effects are similar to the first embodiment, and the description thereof is, therefore, omitted.

Figure 3:
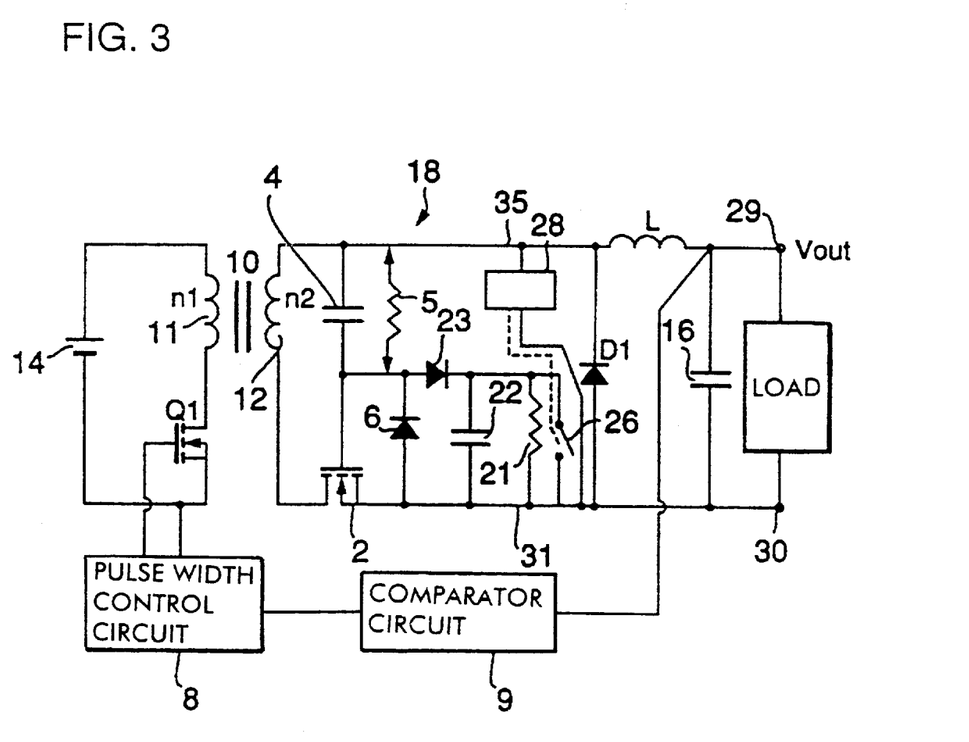
FIG. 3 is a circuit diagram of the major structure of a third embodiment of a forward converter according to the present invention.

FIG. 3 shows a configuration of a third embodiment of the present invention. The third embodiment is differentiated from the first embodiment in that the third embodiment has a structure such that a discharge switching element 26 which is in an off-state during steady state is connected in parallel with the electric charge accumulating capacitor 22, and when the switching operation of the forward converter is halted, or when the reference voltage is exceeded by the peak voltage of the reset pulse to be applied across the gate side of the synchronous rectifier 2 on the rectification side, the discharge switching element 26 is turned on to discharge the electric charge accumulated in the electric charge accumulating capacitor 22, and the other structure thereof is similar to the first embodiment.

In the third embodiment, a switch discharge driver 28 for controlling and driving the discharge switching element 26 is provided. The switch discharge driver 28 detects, for example, that the gate driving of the main switching element Q1 has halted, that the reference value is exceeded by the peak voltage of the reset pulse, or that the reverse current has flown from the output terminal 29 side of the circuit toward the secondary coil 12, and the discharge switching element 26 is turned on.

By turning on the discharge switching element 26, the electric charge accumulated in the electric charge accumulating capacitor 22 is quickly discharged via the discharge switching element 26, and the electric charge accumulating capacitor 22 becomes discharged.

When a plurality of DC—DC converters (forward converters) of the third embodiment are operated, as shown in FIG. 8, in parallel and performing steady switching operation, the electric charge accumulating capacitors 22 of respective forward converters are in a state where the electric charge is accumulated. At this time, when switching operation is halted by, for example, a problem or the like in the forward converter B, a voltage is applied across the forward converter B in non-operating state from the output terminal of the forward converter A in operating state.

At this time, unless a discharge switching element 26 is provided to perform an on-operation, the electric charge due to the voltage added to the output terminal cannot be absorbed by the electric charge accumulating capacitor 22, as the electric charge accumulating capacitor 22 is already saturated with the electric charge. Therefore, the input capacitance of the synchronous rectifier 2 on the rectification side is charged by the applied voltage of the output side to exceed the threshold value, the synchronous rectifier 2 on the rectification side is turned on, and the reverse current flows to the forward converter B in non-operating state, and there is the potential for adverse effects caused by the reverse current generated such that the circuit parts of the main switching element Q1, the synchronous rectifier 2 on the rectification side, the diode D1, or the like may be damaged by the excessive voltage impressed thereon.

Regarding this point, in the third embodiment, the switch discharge driver 28 can immediately detect the halting state of the switching operation, the reference value being exceeded by the peak voltage of the reset pulse, or the reverse current flowing from the output terminal 29 side of the circuit toward the secondary coil 12, to have the discharge switching element 26 turned on, and thus the electric charge of the electric charge accumulating capacitor 22 is discharged. Therefore, even if a voltage is applied across the output terminal of the forward converter B in non-operating state from the forward converter A in operating state, the electric charge due to the voltage is absorbed by the electric charge accumulating capacitor 22 which is discharged by the switching element 26, and thus the synchronous rectifier 2 on the rectification side is never turned on, and therefore the reverse current never flows to the forward converter B in non-operating state, and adverse effects due to the flow of the reverse current can be effectively prevented.

Figure 6:
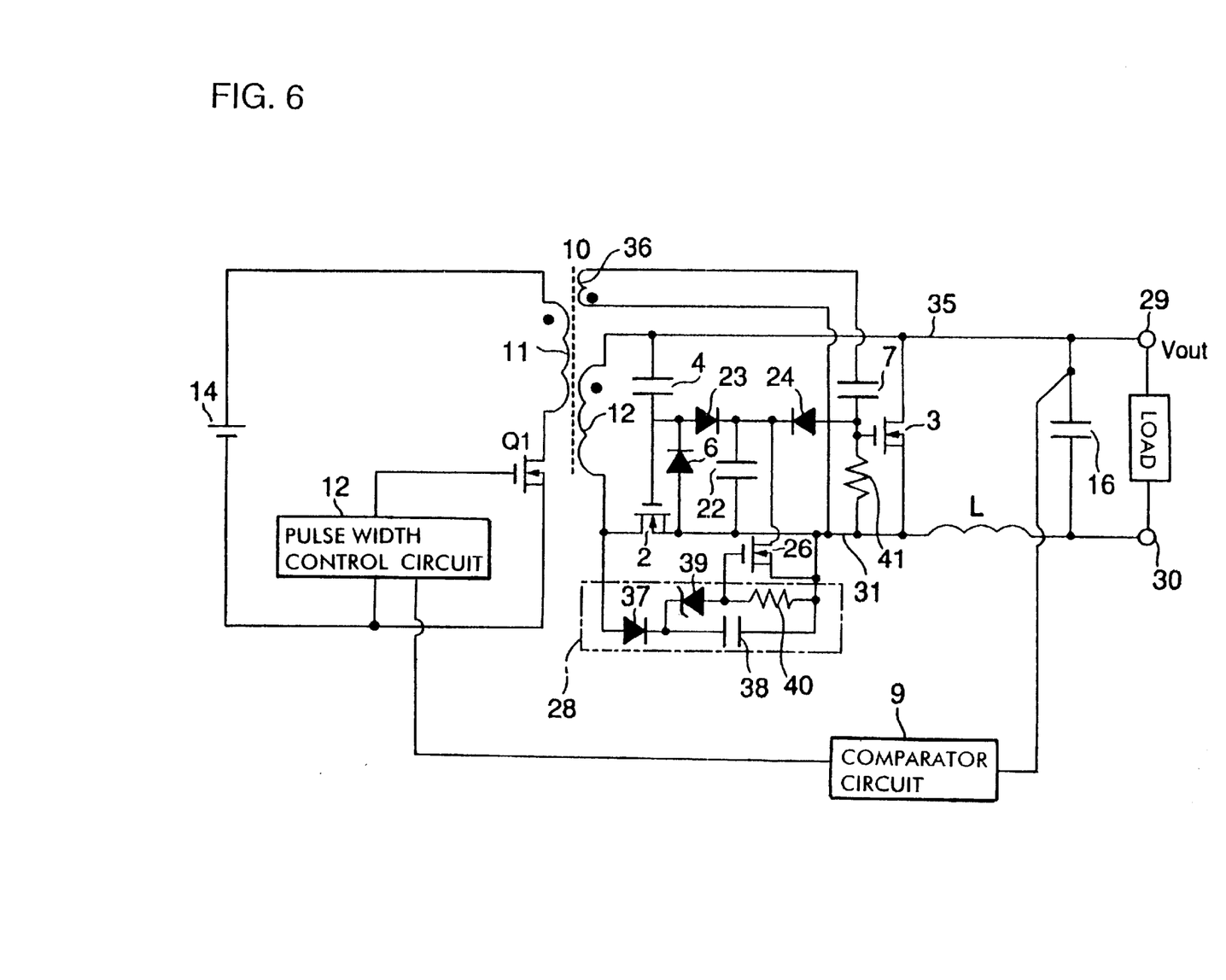
FIG. 6 is a circuit diagram of the major structure of a fourth embodiment of the present invention.

FIG. 6 shows a circuit of a DC—DC converter of a fourth embodiment according to the present invention. The fourth embodiment is differentiated from the circuit shown in FIG. 2 in that a discharge switching element 26 comprising of a MOSFET is connected in parallel with an electric charge accumulating capacitor 22 of the circuit shown in above-described FIG. 2, and the structure of the switch discharge driver 28 of the discharge switching element 26 is shown in more detail. Further, the clamp diode 25 on the commutation side in the circuit shown in FIG. 2 is replaced by a resistor 41 and the snubber resistor 21 shown in FIG. 2 is omitted, the gate driving voltage of the synchronous rectifier 3 on the commutation side is made to be applied from a tertiary coil 36 made by providing an additional coil to the core of the transformer 10, and the choke coil L which is provided on the conductor line 35 side in the circuit shown in FIG. 2 is inserted on the conductor line 31 side, and the other structure is the same as the circuit shown in FIG. 2.

The coil ending terminal of the tertiary coil 36 is connected to the capacitor 7 on the commutation side, and the starting terminal of the tertiary coil is connected to the conductor line 31. The tertiary coil 36 applies, when the main switching element Q1 is turned off, a voltage corresponding to the inverted voltage of the secondary coil 12 to the gate of the synchronous rectifier 3 on the commutation side via the input capacitor 7 on the commutation side, and the synchronous rectifier 3 on the commutation side is turned on. By having the tertiary coil 36 as the driving source of the synchronous rectifier 3 on the commutation side, the driving voltage of the synchronous rectifier 3 on the commutation side can be optimized by properly setting the number of turns of the tertiary coil 36, with the result that the loss of the synchronous rectifier 3 when turned on the commutation side can be reduced.

The switch discharge driver 28 shown in FIG. 6 comprises a diode 37, a capacitor 38, a Zener diode 39, and a resistor 40. The resistor 40 is connected between the gate and source of the discharge switching element 26, and the connection between the resistor 40 and the gate of the discharge switching element 26 is connected to the anode of the Zener diode 39. In parallel with the series circuit of the Zener diode 39 and the resistor 40, the capacitor 38 is connected. To the connection between the capacitor 38 and the Zener diode 39, the cathode of the diode 37 is connected, and the anode of the diode 37 is connected to the connection between the turn-ending terminal of the secondary coil 12 and the drain of the synchronous rectifier 2 on the rectification side.

There are a variety of types for the reversing mode in which an electric current flows in the reverse way from the output terminal side of a DC—DC converter toward the secondary coil 12 side of the transformer 10. As previously described, a voltage, cause by a shift of activating timing when a plurality of DC—DC converters are operated in parallel, is applied from the converter A in operating state to the output terminal side of the forward converter B in non-operating state, and by the voltage applied, the synchronous rectifier 2 on the rectification side of the forward convert in non-operating state is turned on, causing a reverse current to flow from the output terminal side to the secondary coil 12 side of the transformer 10, and an adverse effect of the break down of the synchronous rectifier 2 on the rectification side or the main switching element Q1 due to the current reversing phenomenon at the time of activating can be prevented, as described previously, by the electric charge absorption effect of the electric charge accumulating capacitor 22, even without providing the discharge switching element 26.

However, as an example, when a plurality of forward converters are operated in parallel in steady state operation, if any problem occurs in the forward converter in operation, or the gate driving of the main switching element Q1 is halted by remote control, a self-exciting oscillating phenomenon, in which the synchronous rectifier 2 on the rectification side and the synchronous rectifier 3 on the commutation side are alternatingly turned on and off, by the electric charge accumulated in the smoothing capacitor 16, causing the electric charge accumulated in the smoothing capacitor 16 to reversely flow from the smoothing capacitor 16 to the secondary coil 12 side, and further to the DC input source 14 through a parasitic diode of the main switching element Q1 in non-operating state.

This reverse current tends to be worse with increase of the capacitance of the smoothing capacitor 16, and at worst, a reset pulse voltage of the transformer 10 generated by the above-described self-excited oscillation exceeds the breakdown voltage of the main switching element Q1 or the synchronous rectifier 2 on the rectification side, and the breakdown may be caused.

In this respect, in the DC—DC converter (forward converter) of the fourth embodiment, a pulse voltage generated across the drain and source of the synchronous rectifier 2 on the rectification side by the reset of the transformer 10 is charged at the peak on the diode 37 and the capacitor 38. With a reset pulse in steady state operation, a Zener voltage is set as the reference value lest the Zener diode 39 conducts. However, if the self-excited oscillation is generated and the reset pulse voltage of the transformer 10 exceeds the Zener voltage (reference value) of the Zener diode 39, the resistor 40 conducts to have the discharge switching element 26 turned on, and the gate electric charge of the synchronous rectifier 2 on the rectification side and the synchronous rectifier 3 on the commutation side is discharged, and by having the synchronous rectifier 2 on the rectification side and the synchronous rectifier 3 on the commutation side turned off, the self-exciting oscillation phenomenon is halted. By this operation, the breakdown of the main switching element Q1 and the synchronous rectifier 2 on the rectification side caused by the self-excited oscillation phenomenon is prevented.

It should be noted that the present invention may employ a variety of embodiments, not being limited to the above-described embodiments. For example, in the second embodiment shown in FIG. 2, although the snubber circuit 20 on the rectification side and the snubber circuit on the commutation side are formed by sharing the snubber resistor 21 and the electric charge accumulating capacitor 22, the snubber circuit 20 on the rectification side and the snubber circuit on the commutation side can be formed as mutually independent circuits without sharing circuit parts.

Although in the above described respective embodiments, by providing the clamp diode 6 on the rectification side, and in the second embodiment, by further providing the clamp diode 25 on the commutation side, the gate driving voltage of the synchronous rectifier is made to be maintained at an optimum fixed voltage, without being dependent on the duty ratio of the main switching element Q1, when fluctuation of the gate driving voltage of the synchronous rectifier due to a change of the duty ratio of the main switching element does not come into question, the clamp diode 6 on the rectification side or the clamp diode 25 on the commutation side can be substituted by a resistor. It should be noted that the clamp diodes 6 and 25, provided between the gate and source of the synchronous rectifiers 2 and 3, or the resistors substituted therefore, function as a determining means for the DC potential (DC voltage) across the gate and source of the synchronous rectifiers 2 and 3.

Further, in the circuits of the above-described respective embodiments, when a drop in the gate voltage at the synchronous rectifiers 2 and 3 due to discharge at the time constant of the electric charge accumulating capacitor 22 and the snubber resistor 21 is important in the circuits shown in FIG. 1 and FIG. 3, a resistor 5 is connected in parallel with the input capacitor 4 of the rectification side, and also in FIG. 2 and FIG. 6, the resistor 5 is connected in parallel with the input capacitor 4 on the rectification side, and a resistor 13 is connected in parallel with the input capacitor 7 on the commutation side (in FIG. 6, the resistors 5 and 13 are not shown), thus the gate voltage drop at the synchronous rectifier 2 and 3 may be made to be suppressed, respectively by the divided voltage of the resistor 5 and the resistor 21 (resistor 41 in FIG. 6), and the divided voltage of the resistor 13 and the resistor 21.

Wave form C in FIG. 4 shows the suppression effect of the gate voltage drop. The gate driving waveforms of the synchronous rectifier shown in FIG. 4B is of the case without having the resistor 5 or 13 provided, and in that case, a voltage drop is caused by the discharge at the time constant of the electric charge accumulating capacitor 22 and the snubber resistor 21, thus having the lines H on the top side of the waveforms in the driving operation in the steady state slanting down to the right, and a problem is caused that the gate driving voltage of the synchronous rectifier somewhat deviates from the optimum value. However, the waveforms shown in FIG. 4B are drawn with exaggeration to describe the voltage drop due to the discharge, and in practice, the gradient of the slanted line is small to scarcely cause a problem. However, when the gate driving voltage is to be rigidly optimized, by providing the resistor 5 or 13, the lines H of the top side of the waveforms become horizontal showing no voltage drop, as shown by the waveform C of FIG. 4, and the gate driving voltage can be optimized.

Further, in the above-described respective embodiments, the MOSFETs used in the synchronous rectifiers 2 and 3 are of N-channel type, of course, the MOSFET s of P-channel type may also be used.

Furthermore, in the fourth embodiment shown in the above-described FIG. 6, although an arrangement is shown such that when the reference value is exceeded by the peak voltage of the reset pulse of the transformer 10, the discharge switching element 26 is turned on to discharge the electric charge out of the electric charge accumulating capacitor 22, the discharge switching element 26 may be arranged to be turned on to discharge the electric charge out of the electric charge accumulating capacitor 22, when the reverse current is detected, or when circuit operation (switching operation of a circuit) is detected.

While preferred embodiments of the invention have been disclosed, various modes of carrying out the principles disclosed herein are contemplated as being within the scope of the following claims. Therefore, it is understood that the scope of the invention is not to be limited except as otherwise set forth in the claims.

What is claimed is:

1. A DC—DC converter comprising a main switching element provided on a primary side of a transformer, the transformer having a primary coil and a secondary coil, a synchronous rectifier comprising a MOSFET having a drain source and gate and a drain-source path, the synchronous rectifier coupled to the secondary coil, the synchronous rectifier switching in synchronism with a switching operation of said main switching element, the synchronous rectifier being provided on a line connecting one terminal side of the secondary coil of said transformer with an output terminal of a circuit on a secondary side of said transformer, further comprising an input capacitor, the gate of the synchronous rectifier being coupled so as to have applied thereto a voltage corresponding to an output voltage of said secondary coil by said input capacitor, so that a voltage generated on the primary side by switching operation of said main switching element is transmitted to the secondary side to be rectified and smoothed to output a DC voltage, further comprising a charge accumulating capacitor and a first diode connected in a first series circuit between the gate and source of the synchronous rectifier with a forward direction of the first diode being connected between the gate and source of said synchronous rectifier, and further comprising a discharge element discharging said charge accumulating capacitor connected in parallel with said charge accumulating capacitor.

2. The DC—DC converter of claim 1, wherein the discharge element comprises a resistor.

3. The DC—DC converter of claim 1, wherein the discharge element comprises a switching element.

4. The DC—DC converter of claim 1, further comprising a commutating MOSFET synchronous rectifier, a drain to source path of the commutating MOSFET synchronous rectifier operated in synchronism with the switching operation of the main switching element, the commutating synchronous rectifier being provided between both terminals of the secondary coil of the transformer, a gate of the commutating synchronous rectifier being connected so as to have applied thereto a voltage corresponding to an inverted voltage of the secondary coil at an off-time of the main switching element via a commutation side input capacitor, further comprising a second series circuit comprising a second diode and the electric charge accumulating capacitor connected between the gate and source of said commutating synchronous rectifier having a forward direction of the second diode from the gate to the source and the charge accumulating capacitor being commonly used as an electric charge accumulating capacitor connected to both the second diode and the first diode.

5. The DC—DC converter of claim 4, wherein the second series circuit further comprises a clamping diode coupled across the gate and source of said commutating synchronous rectifier.

6. The DC—DC converter of claim 1, further comprising a discharge switch connected in parallel to the charge accumulating capacitor, and a discharge switch driver discharging an electric charge accumulated in the charge accumulating capacitor by driving said discharge switch when a halt of the switching operation of a main switching element is detected, when a reference value provided to the discharge switch driver is exceeded by a peak voltage of a reset pulse of the transformer, or when a reverse current from an output terminal of a circuit coupled to the secondary coil side of the transformer is detected.

7. The DC—DC converter of claim 4, further comprising a discharge switch connected in parallel to the electric charge accumulating capacitor, and a discharge switch driver discharging an electric charge accumulated in the charge accumulating capacitor by driving said discharge switch when a halt of the switching operation of a main switching element is detected, when a reference value provided to the discharge switch driver is exceeded by a peak voltage of a reset pulse of the transformer, or when a reverse current from an output terminal of a circuit coupled to the secondary coil side of the transformer is detected.

8. A method of operating a DC—DC converter, the converter comprising a main switching element provided on a primary side of a transformer, the transformer having a primary coil and a secondary coil, a synchronous rectifier comprising a MOSFET having a drain, source and gate and a drain source path, the synchronous rectifier coupled to the secondary coil, the synchronous rectifier switching in synchronism with a switching operation of said main switching element, the synchronous rectifier being provided on a line connecting one terminal side of the secondary coil of said transformer with an output terminal of a circuit on a secondary side of said transformer, further comprising an input capacitor, the method comprising providing a voltage corresponding to an output voltage of said secondary coil via the input capacitor to the gate of the synchronous rectifier, so that a voltage generated on the primary side by switching operation of said main switching element is transmitted to the secondary side to be rectified and smoothed to output a DC voltage, further comprising providing a charge accumulating capacitor and a first diode connected in a series circuit between the gate and source of the synchronous rectifier with a forward direction of the first diode connected between the gate and source of said synchronous rectifier, and further comprising discharging said charge accumulating capacitor by connecting a discharge element in parallel with said charge accumulating capacitor.

9. The method of claim 8, further comprising providing a commutating MOSFET synchronous rectifier have a drain, source and gate and being operated in synchronism with the switching operation of the main switching element between both terminals of the secondary coil of the transformer, a gate of the commutating synchronous rectifier being connected so as to have applied thereto a voltage corresponding to an inverted voltage of the secondary coil at an off-time of the main switching element via a commutation side input capacitor, further comprising providing a second series circuit comprising a second diode and the charge accumulating capacitor connected between the gate and source of said commutating synchronous rectifier having a forward direction of the second diode from the gate to the source and the charge accumulating capacitor being commonly used as an charge accumulating capacitor connected to both the second diode and the first diode.

10. The method of claim 8, further comprising providing a discharge switch connected in parallel to the charge accumulating capacitor, and a discharge switch driver discharging an electric charge accumulated in the charge accumulating capacitor by driving said discharge switch when a halt of the switching operation of a main switching element is detected, when a reference value provided to the discharge switch driver is exceeded by a peak voltage of a reset pulse of the transformer, or when a reverse current from an output terminal of the circuit to the secondary coil side of the transformer is detected.

11. The method of claim 9, further comprising providing a discharge switch connected in parallel to the charge accumulating capacitor, and a discharge switch driver discharging an electric charge accumulated in the charge accumulating capacitor by driving said discharge switch when a halt of the switching operation of a main switching element is detected when a reference value provided to the discharge switch driver is exceeded by a peak voltage of a reset pulse of the transformer, or when a reverse current from an output terminal of a circuit coupled to the secondary coil side of the transformer is detected.

\* \* \* \* \*